(12) United States Patent
Iparrea et al.

(10) Patent No.: US 6,377,807 B1
(45) Date of Patent: *Apr. 23, 2002

(54) HIERARCHICAL MESSAGE ADDRESSING SCHEME

(75) Inventors: Roberto Iparrea; Cesar Garcia; Agustin Salguero, all of Saltillo (MX)

(73) Assignee: Telefonaktiebolaget LM Ericsson (publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,572

(22) Filed: Sep. 28, 1999

Related U.S. Application Data

(60) Provisional application No. 60/104,931, filed on Oct. 20, 1998.

(51) Int. Cl.[7] .................................................. H04Q 7/20
(52) U.S. Cl. ........................ 455/445; 455/432; 455/435; 455/428; 455/461; 455/560
(58) Field of Search ................................. 455/445, 428, 455/432, 433, 435, 426, 461, 417, 560

(56) References Cited

U.S. PATENT DOCUMENTS

| | | | | |
|---|---|---|---|---|
| 5,036,531 A | * | 7/1991 | Spear | 379/58 |
| 5,325,419 A | * | 6/1994 | Connolly et al. | 379/60 |
| 5,390,242 A | * | 2/1995 | Bales et al. | 379/221 |
| 5,422,935 A | * | 6/1995 | Spear | 379/63 |
| 5,506,887 A | * | 4/1996 | Emery et al. | 379/58 |
| 5,577,102 A | | 11/1996 | Koivunen | 379/59 |
| 5,758,281 A | * | 5/1998 | Emery et al. | 455/428 |
| 5,771,275 A | * | 6/1998 | Brunner et al. | 379/67 |
| 5,930,348 A | * | 7/1999 | Regnier et al. | 379/221 |
| 5,978,677 A | * | 11/1999 | Sawyer | 455/432 |
| 5,978,678 A | * | 11/1999 | Houde et al. | 455/433 |
| 5,978,681 A | * | 11/1999 | Bertacchi | 455/445 |
| 6,032,043 A | * | 2/2000 | Houde | 455/433 |
| 6,101,392 A | * | 8/2000 | Corriveau | 455/458 |
| 6,185,424 B1 | * | 2/2001 | Pon et al. | 455/445 |
| 6,263,212 B1 | * | 7/2001 | Ross et al. | 455/466 |

FOREIGN PATENT DOCUMENTS

WO    WO 95/12292    5/1995

\* cited by examiner

Primary Examiner—William Trost
Assistant Examiner—Marceau Milord
(74) Attorney, Agent, or Firm—Jenkens & Gilchrist

(57) ABSTRACT

Given access to two or more originating switching node addressing mechanisms (such as, for example, a mobile switching center identification (MSCID), a mobile switching center identification number (MSCIN) and/or a point code subsystem number (PC-SSN)), a serving switching node, when needing to address a message to that originating switching node, implements a hierarchical process for selecting one of the two or more available mechanisms for use in addressing the message. The process gives preference to use of the MSCIN, if present and if the message is being sent in an international routing context, in addressing the message. Alternatively, the process gives preference to use of the PC-SSN, if present and if the message is being sent in a national routing context, in addressing the message. Lastly, the process utilizes the MSCID in addressing the message.

8 Claims, 3 Drawing Sheets

HIERARCHICAL MESSAGE ADDRESSING SCHEME

This application claims the benefit under Title 35 United States Code §119(e) of U.S. Provisional Application No. 60/104931, filed Oct. 20, 1998.

BACKGROUND OF THE INVENTION

1. Technical Field of the Invention

The present invention relates to cellular telephone networks and, in particular, to the addressing of messages transmitted within a cellular telephone network.

2. Description of Related Art

Operation of a cellular telephone network to handle an incoming call dialed to a cellular subscriber mobile station is well known. Responsive to receipt at an originating (or gateway) switching node of the incoming call dialed to a mobile station, a location request (send routing) message is sent to the home location register for the dialed mobile station. The home location register then identifies a switching node currently serving the dialed mobile station. A routing request (provide roaming) message is then sent from the home location register to the serving (or visited) switching node to prepare for delivery of the call. The serving switching node then pages for the mobile station within the network. Responsive to a paging acknowledgment, the mobile station is located and the serving switching node assigns an appropriate routing number (for example, a temporary location directory number or a roaming number) for that location. The routing number is then delivered to the originating switching node via the home location register where it is used to establish a trunk call connection between the originating switching node and the serving switching node. Delivery of the call to the mobile station from the serving switching node is then accomplished by establishing a connection with a base station currently serving the mobile station. A radio frequency communications link is then established between the base station and the mobile station to carry the call connection.

The ANSI-41 (formerly IS-41) standard specifies that certain information be included within the location request and routing request messages to identify originating (or gateway) switching node. This information is needed at the serving switching node to enable the proper addressing of network messages (such as a redirection request message) that are subsequently generated by the serving switching node and addressed to the originating switching node. More specifically, a review of the ANSI-41, TIA/EIA IS-41.5-D, section 6.4.2.27, specification reveals that the location request (LOCREQ) must include a mandatory parameter identifying the originating switching node through the use of its mobile switching center identification (MSCID) for an originating MSC as specified by ANSI-41, TIA/EIA 41.5-D section 6.5.2.82. Similarly, the ANSI-41 specification indicates that the routing request (ROUTREQ) must include a mandatory parameter identifying the originating switching node through the use of its mobile switching center identification (see, TIA/EIA 415-D section 6.4.2.40).

It is recognized, however, that the mobile switching center identification (MSCID) is not the only mechanism available to identify the originating switching node. Two other known mechanisms for identifying the originating switching node within a network message are through the use of its mobile switching center identification number (MSCIN) as specified by ANSI-41, TIA/EIA 41.5-D section 6.5.2.83, or its point code subsystem number (PC-SSN) as specified by ANSI-41, TIA/EIA 41.5-D section 6.5.2.93.

With respect to the location request (LOCREQ) and routing request (ROUTREQ) messages, for example, the ANSI-41 specification indicates that these identification mechanisms may optionally be included as parameters within the messages in addition to the mandatory mobile switching center identification (MSCID). In many instances, the originating (gateway) switching node and other network nodes, such as the home location register, are programmed to include in each message as many as possible, if not all, of the available originating switching node identification mechanisms. Thus, a location request or routing request message may include all of the possible identification mechanisms, MSCID, MSCIN and PC-SSN, for the originating switching node.

Routing problems for subsequent messages originated at the serving switching node may arise when the wrong switching node addressing mechanism is included within the network message. The foregoing may be better understood by reference to several examples. First, consider the situation where the MSCID of the originating switching node is received (as is mandatory in accordance with the ANSI-41 standard). If that received MSCID is not contained within the serving switching node's addressing database (such as may occur when the nodes are located within different national networks), then it will not be possible for that node to properly address a subsequent message (like a redirection request) using the received MSCID. Second, consider the situation where the MSCIN of the originating switching node is received (as is optional in accordance with the ANSI-41 standard). If that node does not support global title translation (GTT), then it will not be possible for the node to properly address a subsequent message (like a redirection request) using the received MSCIN. Third, consider the situation where the PC-SSN of the originating switching node is received (as is optional in accordance with the ANSI-41 standard). If that received PC-SSN is not contained within the serving switching node's addressing database (such as when the the PC-SSN format is not the proper format for the network signaling type (S7/C7) used by the serving switching node), then it will not be possible for that node to properly address a subsequent message (like a redirection request) using the received PC-SSN. It is therefore commonplace to identify the originating switching node in a message (such as a location request message) using at least two, if not all three, of the addressing mechanisms (MSCIN, MSCID and PC-SSN).

While, generally speaking, the more addressing information that is included in the message the better the situation, the inclusion of two or more different originating switching node identification mechanisms in a single message may be problematic for the destination network node. For example, consider the situation where a serving switching node receives a routing request (ROUTREQ) message including not only the mandatory mobile switching center identification (MSCID) but also the optional mobile switching center identification number (MSCIN) and point code subsystem number (PC-SSN) for the originating (gateway) switching node. In this case, the serving switching node has three different mechanisms (each having its own benefits and drawbacks) for possible selection for use in addressing a subsequently originated message (like a redirection request). Which one should be used? The answer to this question may vary from situation to situation, in accordance with, for example the foregoing concerns over database inclusion and global title translation, and thus it is important that the serving switching node intelligently choose from amongst the available options the best addressing mechanism for the originated message.

SUMMARY OF THE INVENTION

Given access to two or more originating switching node addressing mechanisms (such as, for example, a mobile switching center identification (MSCID), a mobile switching center identification number (MSCIN) and/or a point code subsystem number (PC-SSN)), a serving switching node, when needing to address a message to that originating switching node, implements a hierarchical process for selecting one of the two or more available mechanisms for use in addressing the message. The process gives preference to use of the MSCIN, if present and if the message is being sent in an international routing context, in addressing the message. Alternatively, the process gives preference to use of the PC-SSN, if present and if the message is being sent in a national routing context, in addressing the message. Lastly, the process utilizes the MSCID in addressing the message.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
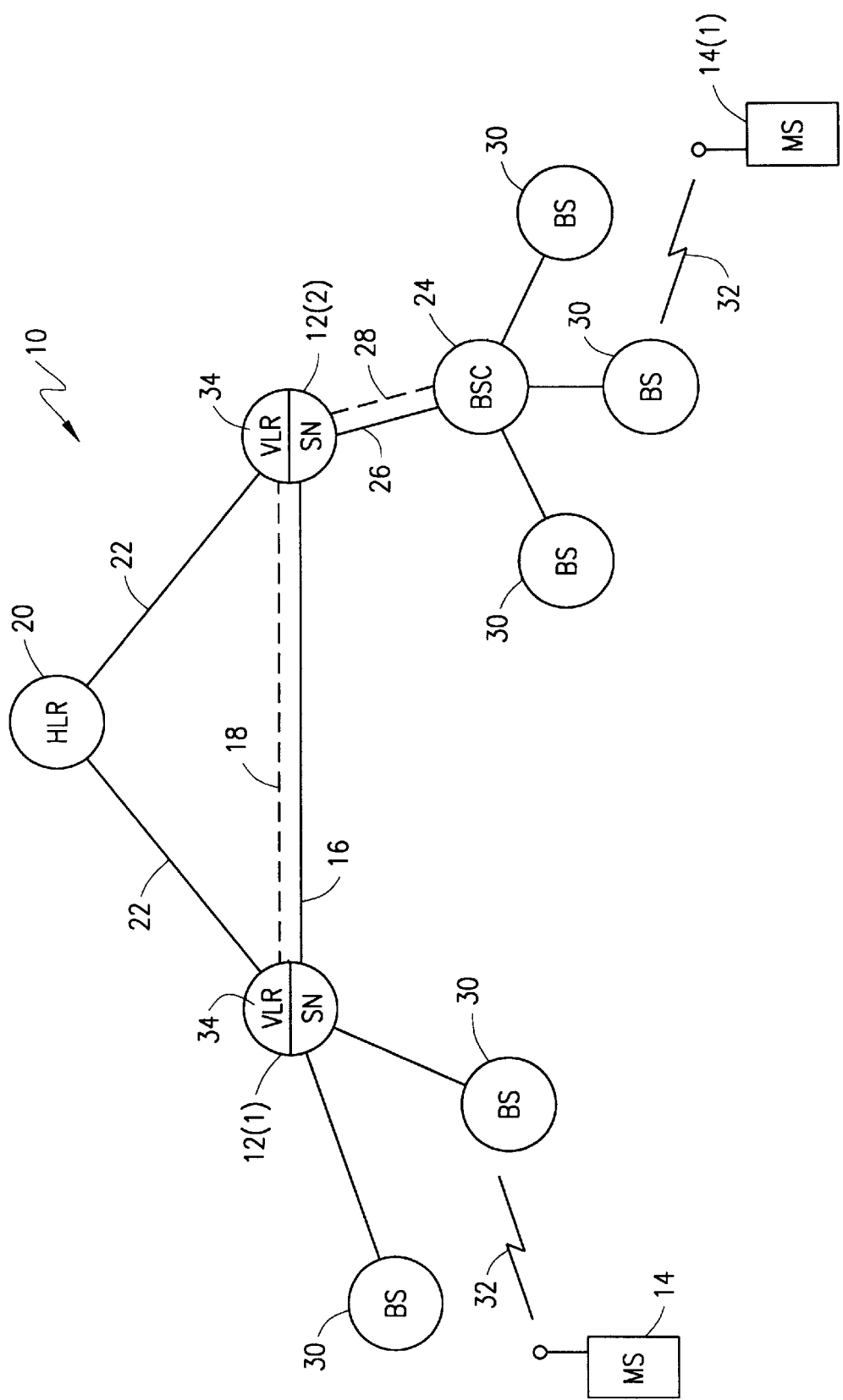
FIG. 1 is a schematic diagram of a cellular telephone network.

Reference is now made to FIG. 1 wherein there is shown a schematic diagram of a cellular telephone network 10 including a plurality of interconnected switching nodes (SN) 12. Although only two switching nodes 12 are shown, it will be understood that the network 10 likely includes many more interconnected nodes. The first and second switching nodes 12(1) and 12(2) may comprise any one of a number of known telecommunications switching devices, including mobile switching centers (MSC's), as commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14. The switching nodes 12 are also connected to a data base 20 comprising a home location register (HLR) by means of signaling links 22 providing a known Mobile Application Part (MAP) or IS-41 type connection. The data base 20 stores information concerning the mobile stations 14 comprising location information and service information.

In one implementation, the switching nodes 12 are further connected to at least one associated base station controller (BSC) 24 via both a signaling link 26 and a voice trunk 28. Only one base station controller 24 is shown connected to the switching node 12(2) in order to simplify the illustration. The voice trunk 28 provides a voice and data communications path used to carry subscriber communications between the switching node 12(2) and its base station controller 24. The signaling link 26 carries command signals between the node 12 and its associated base station controller 24. The signaling link 26 and trunk 28 are collectively commonly referred to in the art as the "MSC-BSC interface". The base station controller 24 is then connected to a plurality of base stations (BS) 30 which operate to effectuate radio frequency communications with proximately located mobile stations 14 over an air interface 32. The base station controller 24 functions in a well known manner to control this radio frequency communications operation. In another implementation, the switching node 12(1) is connected directly to the plurality of base stations (BS) 30. The functionality provided by the base station controller 24 in controlling the radio frequency communications operation is then instead performed by the switching node 12(2).

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the "virtual" manner shown in FIG. 1 is therefore by way of simplification of the drawing. The cellular telephone network 10 may comprise a Global System for Mobile (GSM) communications, an Advanced Mobile Phone System (AMPS), a digital Advanced Mobile Phone System (D-AMPS), a code division multiple access (CDMA) system, or the like.

Figure 2:
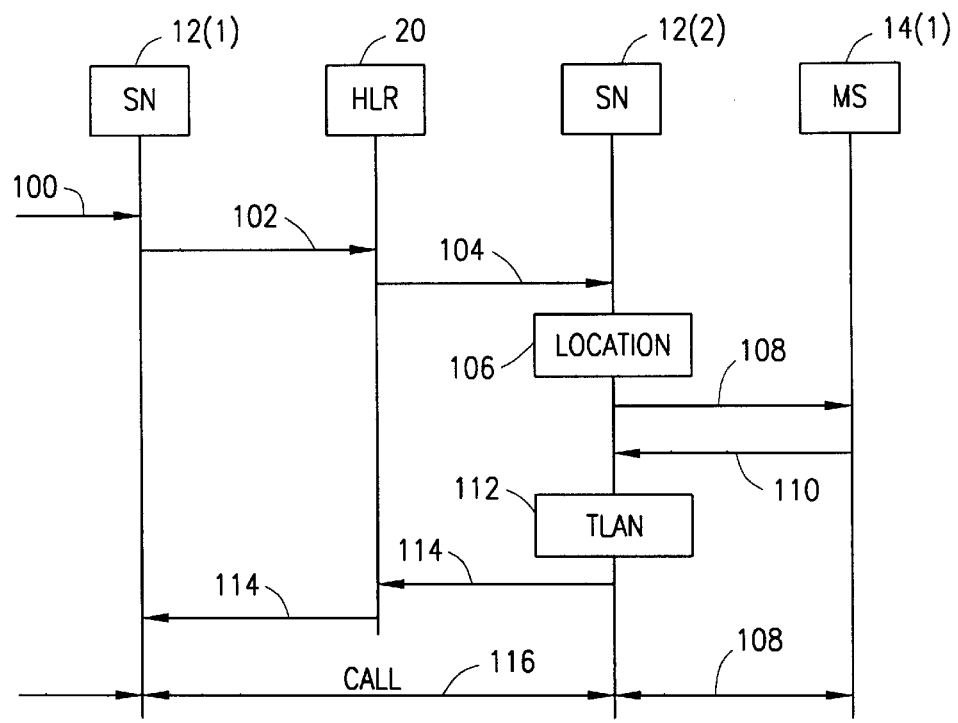
FIG. 2 is a signal flow and node operation diagram illustrating the flow of signals in connection with the well known process for terminating an incoming call.

Reference is now made in combination to FIGS. 1 and 2, wherein FIG. 2 is a signal flow and node operation diagram illustrating the flow of signals in connection with a specific example of the prior art termination of an incoming call. A call 100 dialed to the directory number (B-number) of mobile station 14(1) originates from another cellular subscriber or the public switched telephone network (PSTN) and is received at the first (originating or gateway) switching node 12(1). Using the signaling link 22, the originating switching node 12(1) interrogates the home location register 20 with a location request (send routing) message 102. This message includes a number of parameters at least identifying the originating switching node by means of the mandatory MSCID, but also at least one, if not both, of the optional MSCIN and/or PC-SSN identifications. The location request (send routing) message 102 is processed by the home location register 20 to determine the location (i.e., second or serving switching node 12(2)) within the cellular network 10 of the called mobile station 14(1). Responsive to this interrogation, the home location register 20 signals the serving switching node 12(2) for the called mobile station 14(1) over signaling link 22 with a routing request (provide roaming) message 104 to prepare for the call. This message includes a number of parameters at least identifying the originating switching node by means of the mandatory MSCID, but also at least one, if not both, of the optional MSCIN and/or PC-SSN identifications. The serving switching node 12(2) then determines in action 106 whether the location (for example, location area) of the called mobile station 14(1) is known. This location may be identified, for example, based on information resulting from a most recent registration (not shown) of the called mobile station 14(1) as stored in a visitor location register (VLR) database 34 associated with the serving switching node 12(2). Preferably, the serving switching node 12(2) then pages 108 for the called mobile station 14(1) in the known location, and processes a page acknowledgment 110 to make a more precise (cell) location determination. In accordance with this determined location, the serving switching node 12(2) selects in action 112 an appropriate routing number (for example, a temporary location directory number (TLDN) or a roaming number) for that location (for example, taking in consideration LATA borders and other concerns). In this instance, the routing number is selected from a plurality of such numbers associated with the serving switching node 12(2). The selected routing number is then returned 114 to the originating switching node 12(1) via the home location register 20. The incoming call is then delivered (through connected) 116 over the voice trunk 18 using the routing number to the serving switching node 12(2) for attempted completion to the called mobile station 14(1). Completion of the call involves further routing 118 the incoming call to the currently serving base station 30, and then to the called mobile station 14(1) over the air interface 32.

Figure 3:
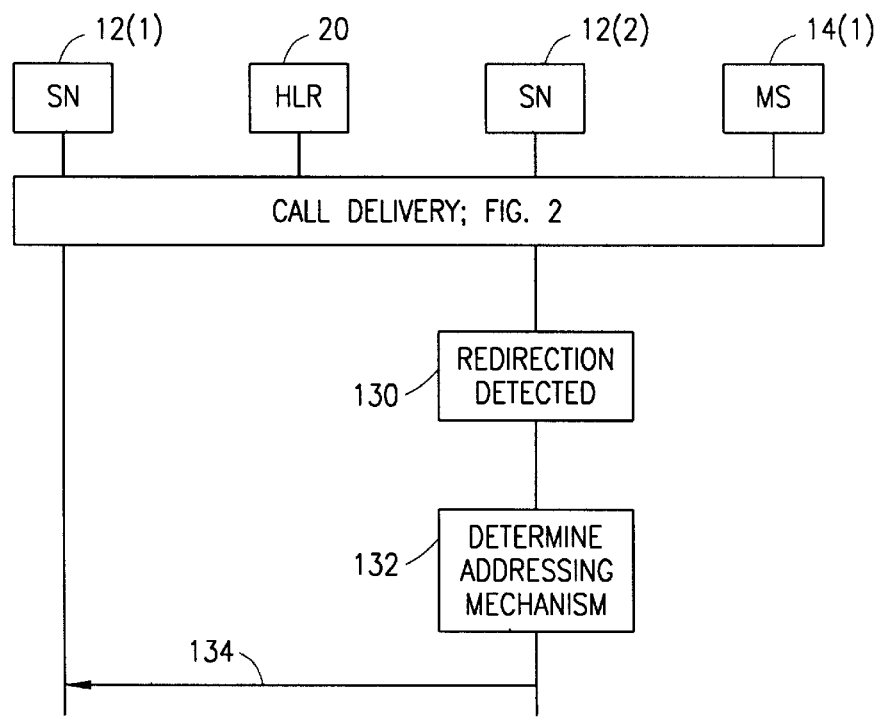
FIG. 3 is a signal flow and node operation diagram illustrating the flow of signals in connection with the handling of a redirection request concerning the call delivered in FIG. 2.

Reference is now made to FIG. 3 wherein there is shown a signal flow and node operation diagram illustrating the flow of signals in connection with the handling of a redirection request concerning the call delivered in FIG. 2. It is assumed that the call delivery process illustrated in FIG. 2 has been completed. At some subsequent point in time, while the call continues to be handled by the network, a need to engage in a call redirection is detected (action 130). The serving switching node 12(2) then determines in action 132 which of the addressing mechanisms (MSCID, MSCIN and/or PC-SSN) to use in order to send a redirection request (REDREQ) message 134 to the originating switching node 12(1).

Figure 4:
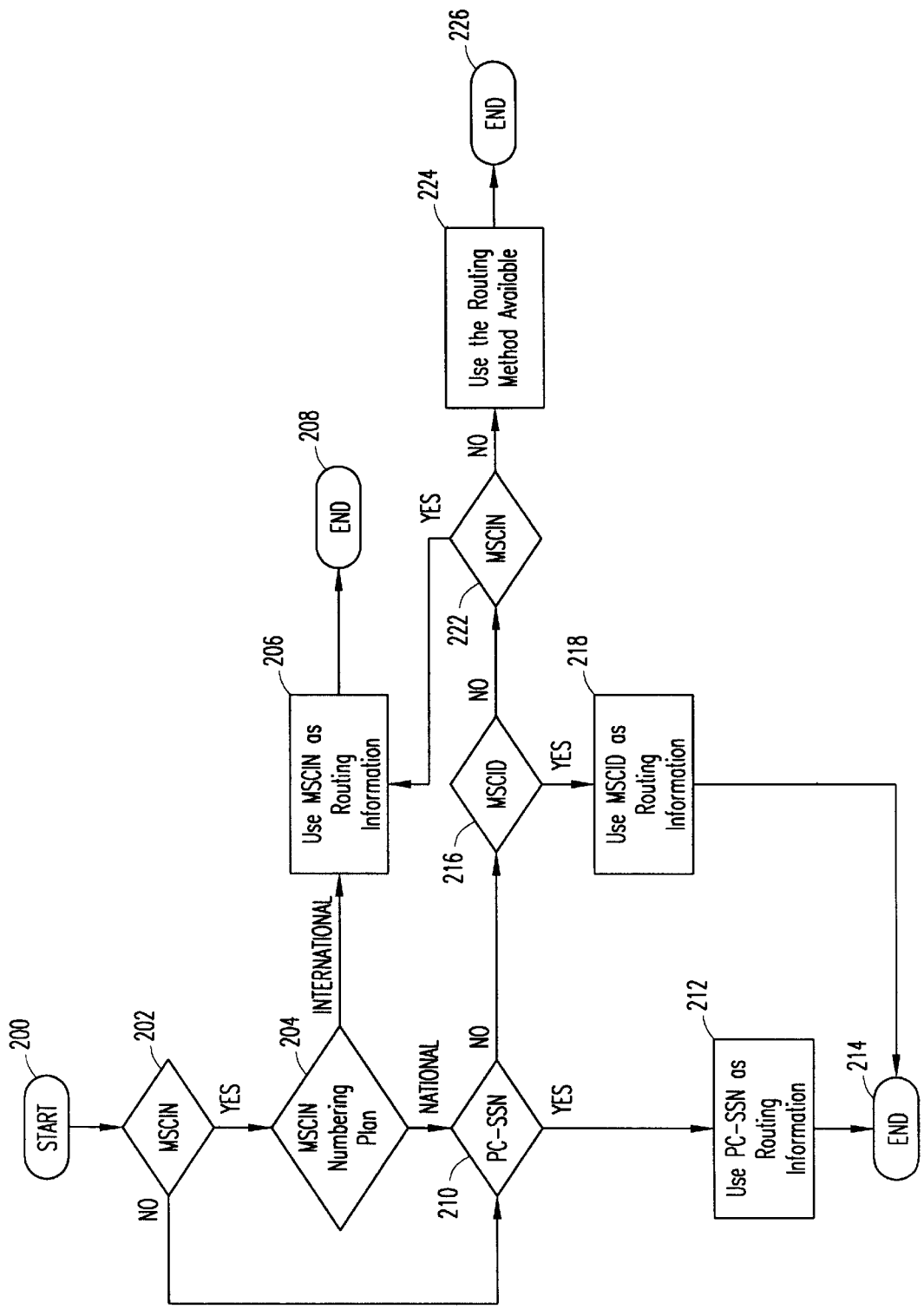
FIG. 4 is a process flow diagram for a procedure implemented by the serving switching node to make the determination of which of the addressing mechanisms (MSCID, MSCIN and/or PC-SSN) to use for the redirection request (REDREQ) message.

Reference is now made to FIG. 4 wherein there is shown a flow diagram for a procedure implemented by the serving switching node to make the action 132 determination of which of the addressing mechanisms (MSCID, MSCIN and/or PC-SSN) to use for the redirection request (REDREQ) message 134. The process starts at step 200. At decision step 202, a determination is made as to whether the serving switching node has access to a valid MSCIN (such as may have been provided in the received routing request message). Any present MSCIN is valid if that node supports global title translation (GTT). If yes, the process next determines in decision step 204 whether the number plan for that present and valid MSCIN is international or national with respect to that serving switching node. If the numbering plan is international, the serving switching node utilizes the MSCIN as the routing mechanism for the subsequently generated message (such as a redirection request) in step 206 and process ends in step 208.

If the step 204 identified numbering plan is national, of if the decision in step 202 is no, a determination is made in step 210 as to whether the serving switching node has access to a valid PC-SSN (such as may have been provided in the received routing request message). Any present PC-SSN is valid if provided in proper format for the network signaling type (S7/C7) used by the serving switching node. If yes, the serving switching node utilizes the PC-SSN as the routing mechanism for the subsequently generated message (such as a redirection request) in step 212 and process ends in step 214.

If the decision is no in step 210, a determination is made in step 216 as to whether the serving switching node has access to a valid MSCID (such as should have been provided in the received routing request message). Any present MSCID is valid if contained within the serving switching node's addressing database. If yes, the serving switching node utilizes the MSCID as the routing mechanism for the subsequently generated message (such as a redirection request) in step 218 and process ends in step 220.

If the decision is no in step 216, a determination is made in step 222 as to whether the serving switching node has access to an MSCIN (such as may have been provided in the received routing request message). If yes, and even though the numbering plan may be national, the serving switching node utilizes the MSCIN as the routing mechanism for the subsequently generated message (such as a redirection request) in step 206 and process ends in step 208. If no, the serving switching node utilizes any alternative method available (such as the calling party address or SCCP calling party information) as the routing mechanism for the subsequently generated message (such as a redirection request) in step 224 and process ends in step 226.

The action 134 determination of FIG. 3 illustrates a hierarchical selection process for choosing which of the potentially available MSCID, MSCIN and/or PC-SSN addressing mechanisms is to be used by the serving switching node in subsequently generating messages like a redirection request. The hierarchical selection process may be described as follow: (a) first preference is given to using the MSCIN with respect to international situations as this is the fastest/easiest mechanism for international addressing; (b) second preference is given to using PC-SSN for national situations as this is the fastest/easiest mechanism for national addressing; (c) third preference is to utilize the MSCID for national situations; and (d) fourth preference is to utilize the MSCIN for national situations. Put another way, the process functions to select, given the available addressing mechanism provided to the serving switching node, the best mechanism for the current situation.

While the MSCID, MSCIN and/or PC-SSN address identification are disclosed as being obtained from the location request and routing request messages, it will be understood that other ANSI-41 messages may also be used to convey this information. For example, the ANSI-41 intersystem page invoke (ISPAGE) message (see, TIA/EIA 415-D section 6.6.2.24) and the unsolicited response return result (unsolres) message (see, TIA/EIA 415-D section 6.4.2.51, table 111) also contain parameters within which the mobile switching center identification (MSCID), mobile switching center identification number (MSCIN) and/or point code subsystem number (PC-SSN) may optionally be carried.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for serving switching node selection from among a plurality of available addressing identifications of an originating switching node including an ANSI-41 mobile switching center identification number (MSCIN) and an ANSI-41 point code subsystem number (PC-SSN) for use in addressing a message from the serving switching node to the originating switching node, comprising the steps of:

detecting a need to send a message from the serving switching node to the originating switching node;

selecting an addressing mechanism for the message from the plurality of available addressing identifications in accordance with a hierarchical selection preference, the step of selecting comprising the steps of:

first selecting by the serving switching node of the MSCIN over any other available addressing identification if provided, valid and the message is to be sent in an international context; and second selecting by the serving switching node of the PC-SSN over any other available addressing identification if provided, valid and the message is to be sent in a national context; and formatting a message by the serving switching node utilizing the preferentially selected addressing mechanism to address the message for delivery to the originating switching node.

2. The method as in claim 1 wherein the message comprises an ANSI-41 redirection request message.

3. The method as in claim 1 wherein the plurality of available addressing identifications further include an ANSI-41 mobile switching center identification (MSCID), and wherein the step of selecting in accordance with the hierarchical selection preference further includes the step of third selecting by the serving switching node of the MSCID over any other available addressing identification if provided, valid and the message is to be sent in a national context.

4. The method as in claim 3 wherein the step of selecting in accordance with the hierarchical selection preference further includes the step of fourth selecting by the serving switching node of the MSCIN over any other available addressing identification if provided, valid and the message is to be sent in a national context.

5. A cellular network comprising an originating switching node connected for message communication to a serving switching node, the serving switching node operating to select from among a plurality of available addressing identifications of the originating switching node including an ANSI-41 mobile switching center identification number (MSCIN) and an ANSI-41 point code subsystem number (PC-SSN) for use in addressing a message from the serving switching node to the originating switching node, the selection process implemented through use of a hierarchical selection preference wherein:

first preference for selection by the serving switching node is given to the MSCIN over any other available addressing identification if provided, valid and the message is to be sent in an international context; and second preference for selection by the serving switching node is given to the PC-SSN over any other available addressing identification if provided, valid and the message is to be sent in a national context.

6. The network as in claim 5 wherein the message comprises an ANSI-41 redirection request message.

7. The network as in claim 5 wherein the plurality of available addressing identifications further include an ANSI-41 mobile switching center identification (MSCID), and wherein the hierarchical selection preference gives third preference for selection by the serving switching node of the MSCID over any other available addressing identification if provided, valid and the message is to be sent in a national context.

8. The network as in claim 7 wherein the hierarchical selection preference gives fourth preference for selection by the serving switching node of the MSCIN over any other available addressing identification if provided, valid and the message is to be sent in a national context.

\* \* \* \* \*